(12) United States Patent
Asahi et al.

(10) Patent No.: US 8,552,675 B2
(45) Date of Patent: Oct. 8, 2013

(54) MOTOR

(75) Inventors: Kyohei Asahi, Kyoto (JP); Eiji Furutachi, Kyoto (JP)

(73) Assignee: Nidec Corporation, Kyoto (JP)

( * ) Notice: Subject to any disclaimer, the term of this patent is extended or adjusted under 35 U.S.C. 154(b) by 309 days.

(21) Appl. No.: 13/121,952

(22) PCT Filed: Oct. 2, 2009

(86) PCT No.: PCT/JP2009/067235
§ 371 (c)(1),
(2), (4) Date: Mar. 31, 2011

(87) PCT Pub. No.: WO2010/038862
PCT Pub. Date: Apr. 8, 2010

(65) Prior Publication Data
US 2011/0181221 A1  Jul. 28, 2011

(30) Foreign Application Priority Data
Oct. 3, 2008 (JP) .................................. 2008-258259

(51) Int. Cl.
*H02K 29/08* (2006.01)
(52) U.S. Cl.
USPC ................. 318/400.39; 318/400.38; 318/647; 318/653; 324/207.2; 324/207.21
(58) Field of Classification Search
USPC ................. 318/400.39, 400.4, 647, 653, 660, 318/400.38; 324/207.2, 207.21, 207.25
See application file for complete search history.

(56) References Cited

U.S. PATENT DOCUMENTS

| | | | |
|---|---|---|---|
| 5,278,497 A | 1/1994 | Ariyoshi | |
| 5,983,720 A * | 11/1999 | Crabb et al. | ............... 73/514.26 |
| 6,013,961 A | 1/2000 | Sakamaki et al. | |
| 6,194,894 B1 | 2/2001 | Apel et al. | |
| 6,377,005 B1 | 4/2002 | Zintler et al. | |
| 6,469,502 B2 * | 10/2002 | Fischer et al. | ............. 324/207.2 |
| 6,486,659 B1 * | 11/2002 | Schroeder | ................ 324/207.21 |
| 6,538,429 B2 * | 3/2003 | Schroeder et al. | ......... 324/207.2 |
| 6,542,068 B1 * | 4/2003 | Drapp et al. | ................ 338/32 H |

(Continued)

FOREIGN PATENT DOCUMENTS

| | | |
|---|---|---|
| JP | 03-025109 U | 3/1991 |
| JP | 05-157507 A | 6/1993 |

(Continued)

OTHER PUBLICATIONS

English translation of Official Communication issued in corresponding International Application PCT/JP2009/067235, mailed on May 26, 2011.

(Continued)

*Primary Examiner* — Paul Ip
(74) *Attorney, Agent, or Firm* — Keating & Bennett, LLP

(57) ABSTRACT

A motor includes a sensor magnet having a non-circular contour and a magnet cover fixed to an end portion of a shaft to cover the end portion of the shaft. The magnet cover includes a support portion positioned outside the end surface of the end portion of the shaft. In the support portion, a magnet hole having a non-circular cross section as the sensor magnet and extending in the direction of the rotation axis is provided. The sensor magnet is inserted into the magnet hole and fixed to the magnet hole.

8 Claims, 5 Drawing Sheets

(56) References Cited

U.S. PATENT DOCUMENTS

| | | | |
|---|---|---|---|
| 6,547,530 B2* | 4/2003 | Ozaki et al. | 417/44.1 |
| 6,744,385 B2* | 6/2004 | Kazuya et al. | 341/15 |
| 6,771,065 B2* | 8/2004 | Pointer | 324/207.2 |
| 6,897,588 B2* | 5/2005 | Okubo | 310/156.36 |
| 6,914,362 B2* | 7/2005 | Lungu | 310/219 |
| 6,930,477 B1* | 8/2005 | Kurita et al. | 324/207.25 |
| 7,109,616 B2* | 9/2006 | Grzywacz et al. | 310/68 B |
| 7,304,472 B2* | 12/2007 | Ramsden | 324/207.25 |
| 7,378,841 B2* | 5/2008 | Kurita et al. | 324/207.25 |
| 7,466,125 B2* | 12/2008 | Heinze et al. | 324/207.25 |
| 7,786,727 B2* | 8/2010 | Sumi et al. | 324/207.25 |
| 7,855,552 B2* | 12/2010 | Steinich | 324/207.25 |
| 8,024,956 B2* | 9/2011 | Hammerschmidt et al. | 73/1.11 |
| 8,286,518 B2* | 10/2012 | Bochen | 74/89.23 |
| 8,294,457 B2* | 10/2012 | Schrubbe et al. | 324/207.25 |
| 2001/0015642 A1* | 8/2001 | Fischer et al. | 324/207.2 |
| 2002/0009363 A1* | 1/2002 | Ozaki et al. | 415/203 |
| 2002/0021124 A1 | 2/2002 | Schott et al. | |
| 2002/0047347 A1 | 4/2002 | Torii et al. | |
| 2002/0109500 A1* | 8/2002 | Schroeder et al. | 324/207.2 |
| 2002/0118010 A1* | 8/2002 | Pointer | 324/207.2 |
| 2002/0171416 A1* | 11/2002 | Schroeder | 324/207.21 |
| 2003/0127939 A1* | 7/2003 | Lungu | 310/219 |
| 2004/0032345 A1* | 2/2004 | Kazuya et al. | 341/15 |
| 2004/0113506 A1* | 6/2004 | Okubo | 310/156.43 |
| 2005/0082926 A1* | 4/2005 | Grzywacz et al. | 310/89 |
| 2006/0006861 A1* | 1/2006 | Heinze et al. | 324/207.21 |
| 2006/0244441 A1* | 11/2006 | Ramsden | 324/207.22 |
| 2007/0090829 A1* | 4/2007 | Kurita et al. | 324/207.25 |
| 2007/0151322 A1* | 7/2007 | Steinich | 73/1.75 |
| 2008/0164866 A1* | 7/2008 | Steinich et al. | 324/207.2 |
| 2008/0164867 A1* | 7/2008 | Steinich et al. | 324/207.2 |
| 2008/0272660 A1 | 11/2008 | Becker et al. | |
| 2009/0072816 A1* | 3/2009 | Schrubbe et al. | 324/207.2 |
| 2009/0123098 A1 | 5/2009 | Takahashi | |
| 2009/0263061 A1* | 10/2009 | Takahashi | 384/446 |
| 2009/0267548 A1* | 10/2009 | Yoo et al. | 318/400.4 |
| 2010/0050731 A1* | 3/2010 | Granig et al. | 73/1.11 |
| 2010/0090633 A1* | 4/2010 | Deller et al. | 318/400.39 |
| 2010/0102802 A1* | 4/2010 | Sumi et al. | 324/207.25 |
| 2010/0321006 A1* | 12/2010 | Suzuki | 324/207.25 |
| 2011/0025309 A1* | 2/2011 | Saruki et al. | 324/207.21 |
| 2011/0236244 A1* | 9/2011 | Tychsen et al. | 418/181 |

FOREIGN PATENT DOCUMENTS

| | | |
|---|---|---|
| JP | 05-196407 A | 8/1993 |
| JP | 06-117807 A | 4/1994 |
| JP | 07-019006 Y2 | 5/1995 |
| JP | 07-218517 A | 8/1995 |
| JP | 11-266568 A | 9/1999 |
| JP | 2000-504428 A | 4/2000 |
| JP | 2000-282723 A | 10/2000 |
| JP | 2000-315607 A | 11/2000 |
| JP | 2002-034207 A | 1/2002 |
| JP | 2002-071381 A | 3/2002 |
| JP | 2003-324930 A | 11/2003 |
| JP | 3517350 B2 | 4/2004 |
| JP | 2006-158059 A | 6/2006 |
| JP | 2006-233985 A | 9/2006 |
| JP | 2007-089312 A | 4/2007 |
| WO | 03/008911 A1 | 1/2003 |
| WO | 2007/079996 A1 | 7/2007 |

OTHER PUBLICATIONS

Official Communication issued in International Patent Application No. PCT/JP2009/067235, mailed on Dec. 8, 2009.

* cited by examiner

MOTOR

BACKGROUND OF THE INVENTION

1. Field of the Invention

The present invention relates to a motor provided with a sensor magnet at an end portion of a shaft.

2. Description of the Related Art

A contactless rotation angle detection device for detecting, e.g., the rotation angle of a motor, is usually of the type using, e.g., a resolver or a plurality of Hall ICs.

In recent years, a rotary encoder including a magnet attached to an end surface of a shaft and a sensor provided in an opposing relationship with the magnet has been used.

Japanese Patent No. 3517350 discloses a conventional example of a motor in which a magnet attached to a rotating shaft is prevented from moving about the rotating shaft through the use of a bush.

However, if the magnet includes a raised portion or a recess portion formed in the magnet that is used to restrict movement of the magnet about the rotation axis of a shaft, the magnet becomes, e.g., difficult to mold and vulnerable to cracking or breakage. This vulnerability is disadvantageous in terms of productivity and durability. Moreover, raised portions and recessed portions may cause a change in the magnetic force of the magnet, thereby adversely affecting the detection accuracy of a sensor including the magnet.

SUMMARY OF THE INVENTION

Preferred embodiments of the present invention provide a motor which is simple in structure, capable of reliably fixing a sensor magnet against movement relative to the rotation axis of a shaft and capable of enabling a sensor to reliably detect a magnetic change of the sensor magnet with increased accuracy.

A motor according to a preferred embodiment of the present invention includes a sensor magnet and a cover member fixed to an end portion of the shaft to at least partially cover the end portion of the shaft. The cover member includes a support portion positioned outside the end surface of the end portion of the shaft. The support portion is preferably provided with a space area having a substantially non-circular cross section which extends along the rotation axis. The sensor magnet preferably has a non-circular contour that conforms with or corresponds to the cross section of the space area. The sensor magnet inserted into the space area.

With the motor according to a preferred embodiment of the present invention, it is possible to securely fix the sensor magnet to the shaft so that the sensor magnet will not rotate about the rotation axis into a deviated position or be removed from the shaft. Moreover, the present motor enables the sensor to reliably detect the magnetic change in the sensor magnet with increased accuracy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the accompanying drawings which form a part hereof. The following description of the preferred embodiments is merely for illustrative purposes and is not intended to limit the scope of the present invention and the application or use thereof.

Figure 1:
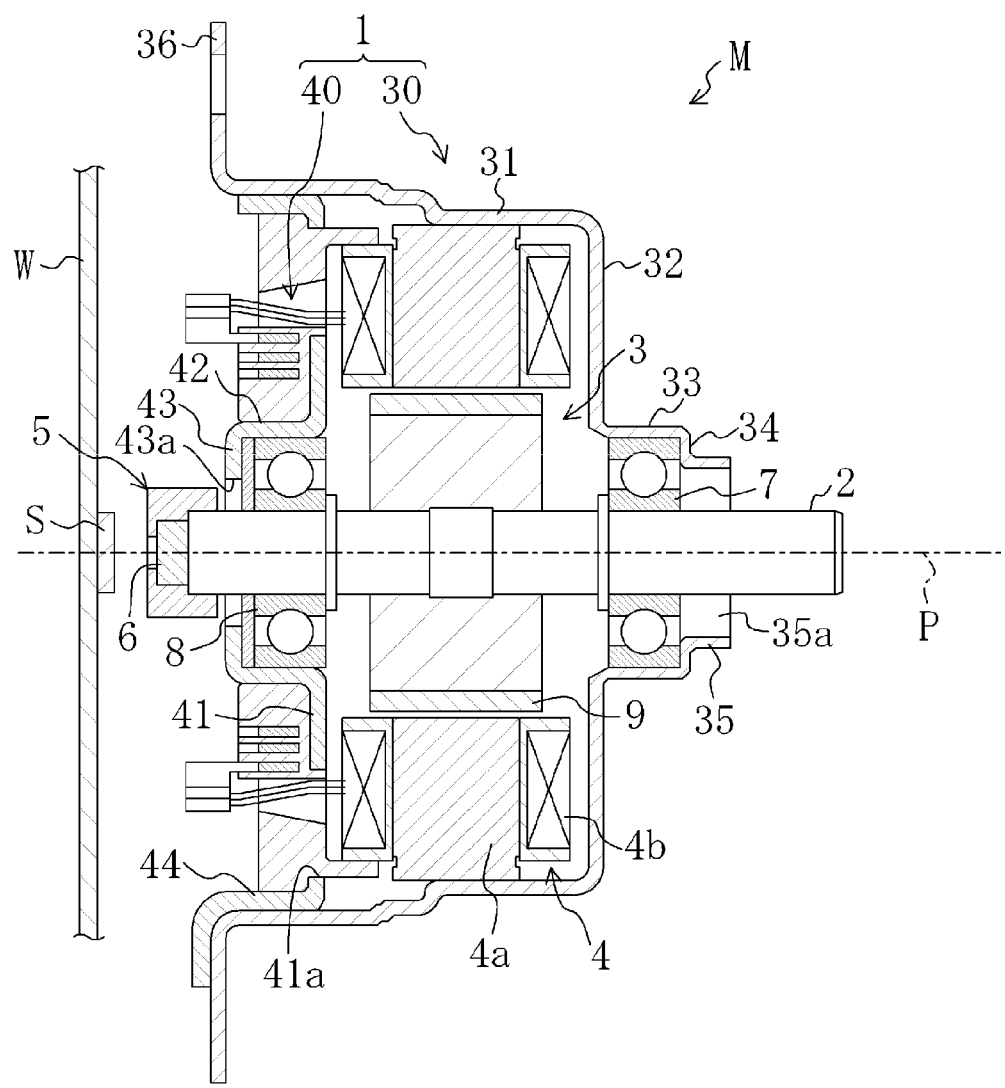
FIG. 1 is a vertical section view schematically showing a motor according to a preferred embodiment of the present invention.

FIG. 1 is a vertical section view schematically showing a motor M according to a preferred embodiment of the present invention. The motor M may be, e.g., a motor mounted to a motor vehicle to drive a transfer case, a transmission, a power steering device, etc. The motor M preferably includes a motor housing 1, a shaft 2, a rotor 3, a stator 4, a magnet cover 5 (or a cover member) and a sensor magnet 6.

The motor housing 1 preferably includes a first housing member 30 having a case shape and a second housing member 40 having a bottom cover shape, both of which are preferably formed by pressing a steel plate, for example. However, it should be noted that any other desirable motor housing formation method could be used to make the first housing member 30 and the second housing member 40.

The first housing member 30 preferably has a substantially cylindrical multistage shape and preferably includes a substantially cylindrical peripheral wall portion 31, a side wall portion 32, a first bearing wall portion 33, a substantially step-shaped wall portion 34, an end wall portion 35 and a flange portion 36. The first bearing wall portion 33 preferably has a substantially cylindrical shape with a diameter smaller than the diameter of the peripheral wall portion 31 and is joined to one end edge of the peripheral wall portion 31 through the side wall portion 32. The end wall portion 35 preferably has a substantially cylindrical shape with a diameter smaller than the diameter of the first bearing wall portion 33 and is joined to one end of the first bearing wall portion 33 through the substantially step-shaped wall portion 34. The flange portion 36 is arranged to extend radially outwards from the other end edge of the peripheral wall portion 31. The tip end of the end wall portion 35 is opened to form an opening 35a.

The second housing member 40 preferably includes a substantially annular bottom cover wall portion 41, a second bearing wall portion 42, a substantially annular ring-shaped wall portion 43 and a substantially cylindrical fit wall portion 44. The second bearing wall portion 42 is formed to extend along the inner edge of the bottom cover wall portion 41. The substantially annular ring-shaped wall portion 43 extends radially inwards from the tip end edge of the second bearing wall portion 42 and has an opening 43a defined substantially at the center of the second housing member 40. The fit wall portion 44 is joined to the outer edge of the bottom cover wall portion 41 and is opposed to the second bearing wall portion 42.

If the second housing member 40 is fitted toward the flange portion 36 of the first housing member 30 with the second bearing wall portion 42 facing outwards of the motor M, the outer surface of the fit wall portion 44 is bonded to the inner surface of the peripheral wall portion 31. As a consequence, there is provided a motor housing 1 having an internal space for accommodating the stator 4 and other components.

The shaft 2 is preferably made from a substantially cylindrical steel member, for example. However any other desirable type of shaft could be used instead. The shaft 2 is arranged to be supported on the inner circumferential surfaces of the first and second bearing wall portions 33 and 42 of the motor housing 1 through a first bearing 7 and a second bearing 8 so that it can rotate about a rotation axis P. The substantially step-shaped wall portion 34 and the substantially annular ring-shaped wall portion 43 are arranged to cup and support the end portions of the first and second bearings 7 and 8, to thereby prevent removal of the first and second bearings 7 and 8 and the shaft 2 from the motor housing 1. The tip end portion of the shaft 2, to which a gear or the like may preferably be attached, protrudes from the opening 35a of the first housing member 30 toward the outside of the motor housing 1. The base end portion of the shaft 2 opposite to the tip end portion protrudes from the opening 43a of the second housing member 40 toward the outside of the motor housing 1.

The rotor 3 is a substantially cylindrical columnar member fixed to the substantially middle portion of the shaft 2 in the direction of the rotation axis P and is positioned between the first bearing 7 and the second bearing 8. A plurality of magnets 9 is arranged around the rotor 3.

The stator 4 preferably includes a ring-shaped stator core 4a with tooth portions arranged at equal or nearly equal intervals in a circumferential direction and a plurality of coils 4b that are preferably formed by winding electrically conductive wires around the tooth portions, for example. However, other types of coils, such as, for example, pre-formed coils, could be used instead if so desired. The stator 4 is preferably an annular or substantially annular member. The outer circumferential portion of the stator 4 is attached to the inner surface of the peripheral wall portion 31 of the motor housing 1 so that the inner circumferential portion of the stator 4 can be adjacent to the outer circumference of the rotor 3 with a minute gap left therebetween.

Wiring holes 41a are defined at some points in the bottom cover wall portion 41 of the second housing member 40. Electrically conductive wires are led from the stator 4 into the motor housing 1 through the wiring holes 41a and then connected to a control circuit (not shown in the drawings). As an electric current is fed through the coils 4b of the stator 4, the shaft 2 will be moved to rotate together with the rotor 3.

The sensor magnet 6 for a rotary encoder is attached to the motor M to detect the rotation angle or the rotation speed of the shaft 2.

The rotary encoder preferably includes one sensor S and one sensor magnet 6. The sensor S is preferably provided by a sensor chip of about 5 mm in length and breadth. Magnetic flux detection elements such as, for example, Hall elements or GMR elements are arranged inside the sensor chip. The rotary encoder further includes a rotation angle calculation unit. The Hall elements detect a change in the magnetic field component perpendicular or substantially perpendicular to the surface of the sensor chip. The rotation angle calculation unit calculates the rotation angle of the shaft 2 based on the value detected by the Hall elements. The sensor magnet 6 is a permanent magnet having a planar opposing surface 6a whose size is substantially equal to the size of the sensor chip. The sensor magnet 6 includes an N-pole and an S-pole contiguously arranged to bisect the opposing surface 6a (see FIG. 2).

The sensor magnet 6 is attached to the end surface 2a of the shaft 2 as a detection target so that the center of the opposing surface 6a can be positioned on the rotation axis P. The sensor S is arranged so that the surface of the sensor chip can be provided in a closely opposing relationship with the opposing surface 6a of the sensor magnet 6.

In order to enhance the detection accuracy of the rotary encoder, it is therefore preferred that the sensor magnet 6 be positioned as close to the sensor S as possible such that that the magnetic force of the sensor magnet 6 acting toward the opposing surface 6a be as strong as possible.

For example, the sensor S of the present preferred embodiment of the present invention is attached to the wall surface W in a closely opposing relationship with the base end portion of the shaft 2 as shown in FIG. 1. The wall surface W may be, e.g., the wall surface of an ECU (electronic control unit) of a motor vehicle. Although not shown in the drawings, the motor M is preferably fastened to, for example, a motor vehicle through the flange portion 36.

Figure 2:
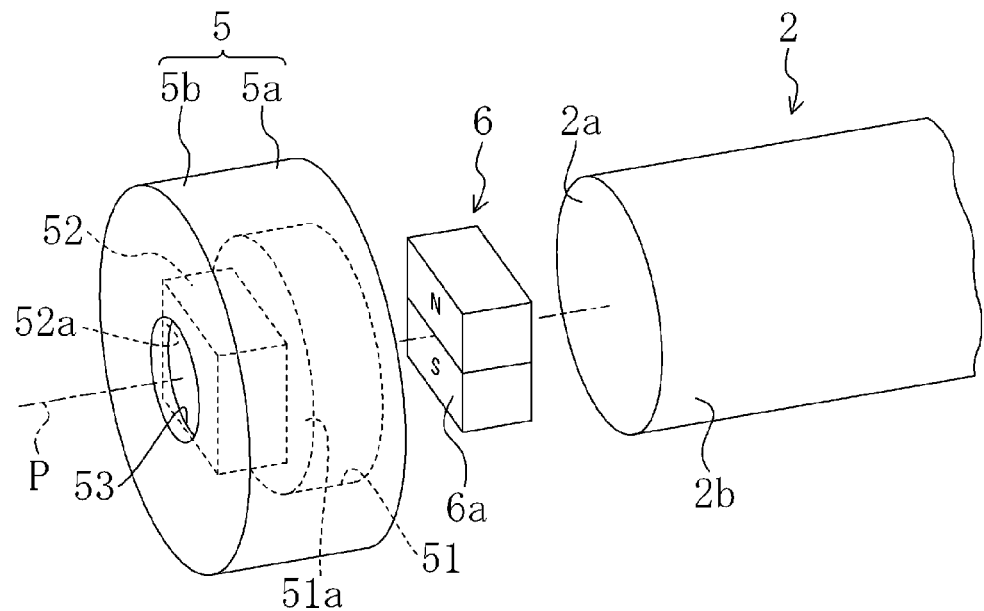
FIG. 2 is an exploded perspective view schematically showing certain major components of the motor according to a preferred embodiment of the present invention.
Figure 3:
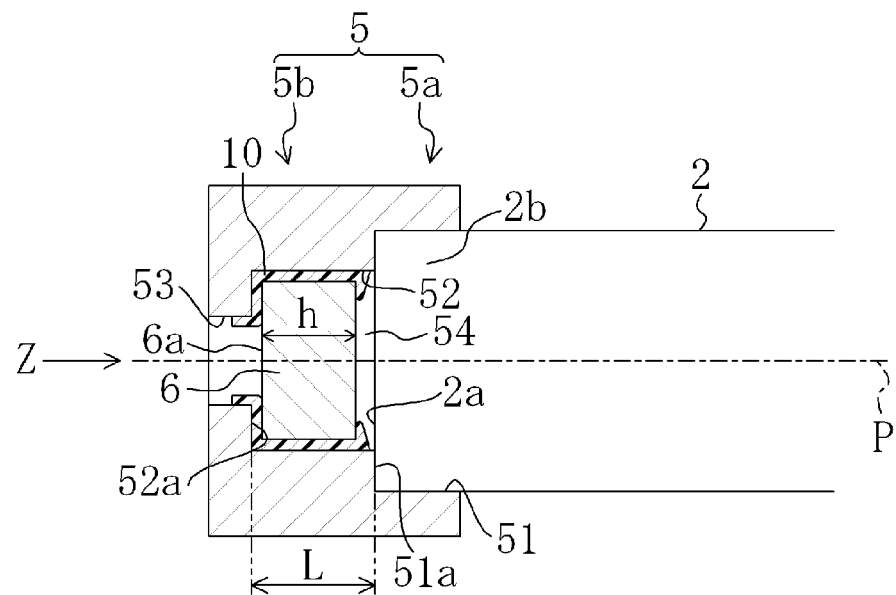
FIG. 3 is a section view schematically showing certain major components of the motor according to a preferred embodiment of the present invention.
Figure 4:
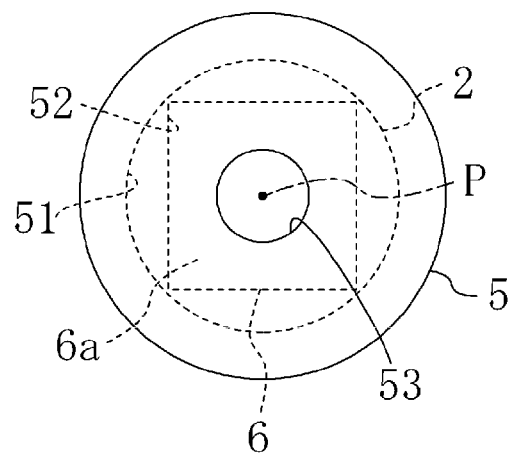
FIG. 4 is a side view seen in the direction indicated by an arrow Z in FIG. 3, schematically showing certain major components of the motor according to a preferred embodiment of the present invention.

The sensor magnet 6 of the present preferred embodiment of the present invention is attached to the end portion of the shaft 2 using the magnet cover 5 so that the sensor magnet 6 should not rotate about the rotation axis P into a deviated position or should not be removed from the shaft 2. FIG. 2 is a perspective view showing the attachment structure of the sensor magnet 6. FIG. 3 is a section view thereof. FIG. 4 is a side view seen in the direction indicated by an arrow Z in FIG. 3.

The outer diameter of the magnet cover 5 is greater than the diameter of the shaft 2. The length of the magnet cover 5 in the direction of the rotation axis P is smaller than the axial length of the shaft 2. The magnet cover 5 is preferably a substantially cylindrical columnar brass product, for example, though any other desirable material could be used. The magnet cover 5 preferably includes a fixing portion 5a positioned on the outer circumferential surface 2b of the base end portion of the shaft 2 when the magnet cover 5 is attached to the shaft 2 and a support portion 5b positioned axially outwards of the end surface 2a of the base end portion of the shaft 2.

A shaft hole 51 having a substantially circular cross section and extending in the direction of the rotation axis P is opened substantially in the central area of one end surface of the magnet cover 5. The portion of the magnet cover 5 defining the periphery of the shaft hole 51 defines the fixing portion 5a, while the portion of the magnet cover 5 defining the bottom surface 51a of the shaft hole 51 defines the support portion 5b. A magnet hole 52 (or a space area) having a substantially square cross section and extending in the direction of the rotation axis P is opened substantially in the central area of the bottom surface 51a of the shaft hole 51. The intersection point of diagonal lines of the square cross section of the magnet hole 52 is preferably positioned on the rotation axis P. A through-hole 53 smaller in diameter than the shaft hole 51 is defined between the bottom surface 52a of the magnet hole 52 and the other end surface of the magnet cover 5.

By forming the magnet cover 5 from a non-magnetic material (preferably brass), it is possible to prevent the magnet cover 5 from interfering with or distorting the magnetic force of the sensor magnet 6. The motor mounted to a motor vehicle is often used in an environment in which the temperature fluctuates heavily. Since brass has a thermal shrinkage relatively close to that of the steel-made shaft 2, formation of the magnet cover 5 with brass makes it possible to prevent removal or looseness of the magnet cover 5 that would be result if a material with thermal properties different from those of the shaft were used.

The sensor magnet 6 is a little larger in size than the magnet hole 52. The sensor magnet 6 is a substantially flat permanent magnet having a substantially square outward appearance that substantially corresponds to the shape of the magnet hole 52. In the present preferred embodiment of the present invention, a rare-earth-metal sintered magnet, e.g., an Nd—Fe—B sintered magnet, is preferably used as the sensor magnet 6, for example. It is also possible to use a Sm—Co sintered magnet or any other type of suitable magnet as the sensor magnet 6 if so desired.

Since the magnet of this kind sometimes needs to be molded into a complicated shape or integrally molded with other members, it is often the case that an easily-moldable bond magnet is generally used. In this case, however, the magnetic force of a bond magnet is weaker than other magnets because the bond magnet contains a resin or other like materials as a filler. In contrast, the sintered magnet is free from such a drawback and is capable of effectively exhibiting the performance of a material. Even if the sintered magnet has a small size, it can generate a magnetic force great enough to be detected by the sensor S.

By forming the sensor magnet 6 into a substantially square shape, it is possible to produce, e.g., a substantially flat large-sized sintered magnet, and then divide the same into a desired size with no waste. This is advantageous in view of the manufacturing cost and productivity.

The depth L of the magnet hole 52 is preferably greater than the thickness h of the sensor magnet 6 (as shown in FIG. 3).

In order to attach the sensor magnet 6 to the base end portion of the shaft 2, a liquid or gelatinous adhesive agent 10 is preferably first applied on the inner surface of the magnet hole 52 of the magnet cover 5, specifically on the bottom surface 52a and the inner circumferential surface of the magnet hole 52. Although the specific type of adhesive agent 10 used does not matter, it is desirable that the adhesive agent 10 be superior in heat resistance and possess quick drying ability. Then, the sensor magnet 6 is inserted into the magnet hole 52 and fixed to the bottom surface 52a of the magnet hole 52. Since the through-hole 53 is defined in the bottom surface 52a of the magnet hole 52, the excess of the adhesive agent 10 is extruded outwards from the through-hole 53 so that the sensor magnet 6 can be brought into close contact with the bottom surface 52a of the magnet hole 52. The end surface of the sensor magnet 6 near the shaft hole is positioned inwards of the magnet hole 52 away from the bottom surface 51a of the shaft hole 51, thereby defining an air gap 54 corresponding in size to the difference between the depth L of the magnet hole 52 and the thickness h of the sensor magnet 6. The adhesive agent 10 may be injected into the air gap 54 or the adhesive agent 10 applied to the inner surface of the magnet hole 52 may be allowed to flow into the air gap 54 so that the adhesive agent 10 can be cured at least in a partial area of the air gap 54.

Inasmuch as the cross section of the magnet hole 52 and the contour of the sensor magnet 6 are non-circular and substantially square, the sensor magnet 6 and the magnet cover 5 are prevented from making relative rotation about the rotation axis P. In addition, the adhesive agent 10 cured between the sensor magnet 6 and the magnet cover 5 keeps the sensor magnet 6 and the magnet cover 5 bonded together and prevents looseness or positional deviation thereof.

Subsequently, the base end portion of the shaft 2 is press-fitted to the shaft hole 51 of the magnet cover 5 to which the sensor magnet 6 has been fixed. The end surface 2a of the shaft 2 is propped by the bottom surface 51a of the shaft hole 51. Therefore, even if an excessive load is applied in the press-fitting process, there is no possibility that the load acts on the sensor magnet 6 positioned inwards of the magnet hole 52 away from the bottom surface 51a of the shaft hole 51. This assists in preventing breakage or removal of the sensor magnet 6. Accordingly, it is possible to securely attach the magnet cover 5 to the shaft 2 with no fear of looseness or removal of the magnet cover 5. Instead of using a press-fit, the end portion of the shaft 2 may instead be fixed to the magnet cover 5 through, for example, a pin or fastener or could even be fastened to the magnet cover 5 after the shaft 2 is inserted into the magnet cover 5.

Since the sensor magnet 6 is accommodated within the magnet cover 5 thus attached, it is possible to reliably prevent removal of the sensor magnet 6 from the base end portion of the shaft 2.

Due to the fact that the sensor magnet 6 is closely fixed to the bottom surface 52a of the magnet hole 52, it is possible to bring the sensor magnet 6 into close proximity to the sensor S and to increase the detection accuracy in proportion thereto.

If the shaft 2 is a magnetic body, it is likely that the magnetic flux flowing toward the shaft 2 is increased and the magnetic flux flowing into the sensor S is decreased when the sensor magnet 6 comes onto contact with the shaft 2. However, such likelihood does not exist because the sensor magnet 6 is kept spaced apart from the shaft 2 by the air gap 54. This enables the sensor magnet 6 to exhibit its performance in an efficient manner.

Figure 5:
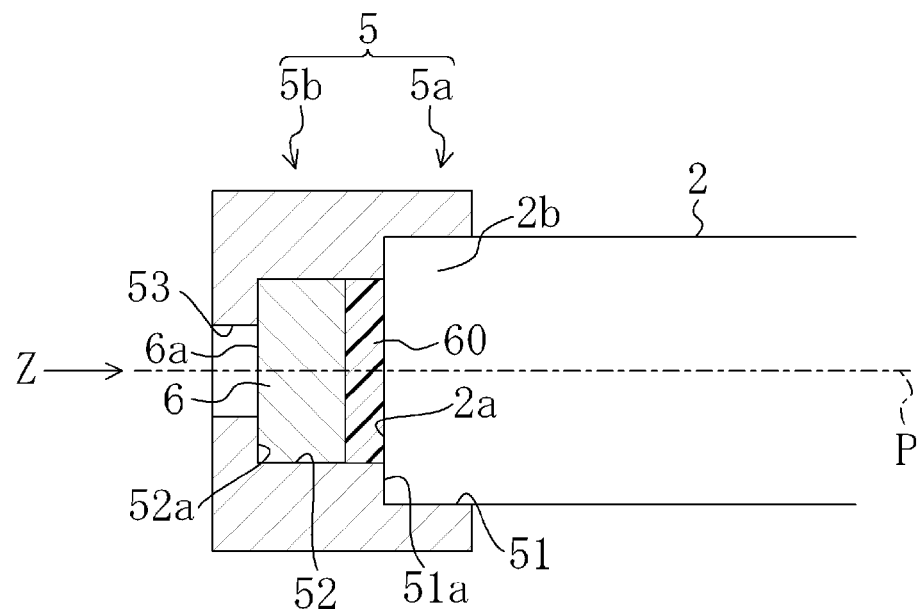
FIG. 5 is a section view of one modified example of the sensor magnet attachment structure, schematically showing certain major components of the motor according to a preferred embodiment of the present invention.
Figure 6:
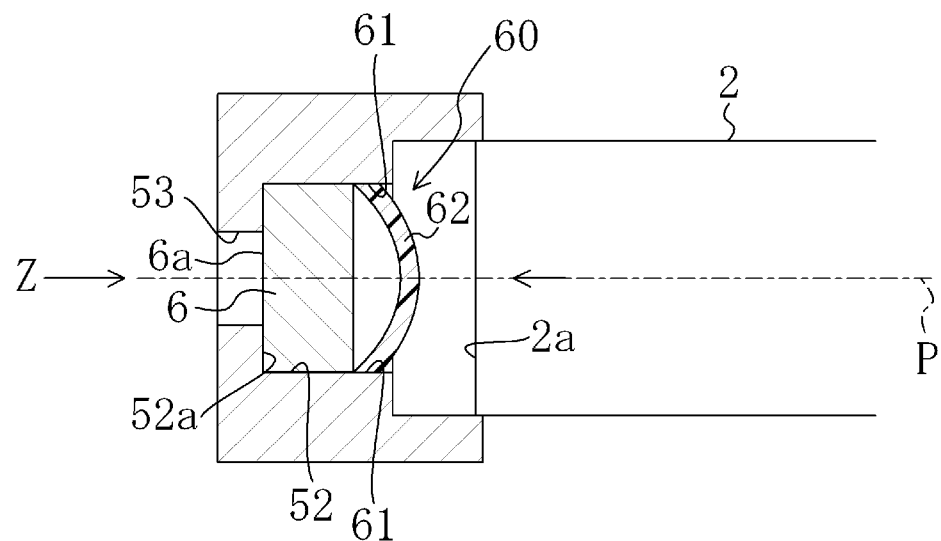
FIG. 6 is a section view of another modified example of the sensor magnet attachment structure, schematically showing certain major components of the motor according to a preferred embodiment of the present invention.

FIGS. 5 and 6 show preferable modified examples of the attachment structure of the sensor magnet 6.

In these modified examples, the sensor magnet 6 is fixed within the magnet hole 52 through the use of an elastic member 60.

The elastic member 60 may preferably be a non-magnetic and elastic member. For example, as shown in FIG. 5, the elastic member 60 may preferably have a side surface whose area is smaller than the cross-sectional area of the sensor magnet 6 and a thickness greater than the length of the air gap 54 in the direction of the rotation axis P. The elastic member 60 may be made of a resin such as, for example, rubber, silicon, etc.

As shown in FIG. 6, the elastic member 60 may preferably be a spring member (sometimes called a spring member 60). The spring member 60 is preferably made from a substantially square flat resin piece having a substantially arc-shaped cross section, for example. The height from the opposite lateral end portions 61 to the curved apex portion 62 is preferably greater than the length of the air gap 54 in the direction of the rotation axis P. Therefore, if the shaft 2 is press-fitted to the shaft hole 51 in a state that the lateral end portions 61 of the spring member 60 is in contact with the end surface of the sensor magnet 6 inserted into the magnet hole 52, the apex portion 62 of the spring member 60 is pushed and elastically deformed by the end surface 2a of the shaft 2, thereby pressing the sensor magnet 6 against the bottom surface 52a of the magnet hole 52.

If the sensor magnet 6 is pressed against the bottom surface 52a of the magnet hole 52 by the elastic member 60 in the press-fitting process of the shaft 2, the air existing within the magnet hole 52 is expelled through the through-hole 53 defined in the bottom surface 52a. Thus, the sensor magnet 6 is closely fixed to the bottom surface 52a of the magnet hole 52 in an easier manner.

Figure 7:
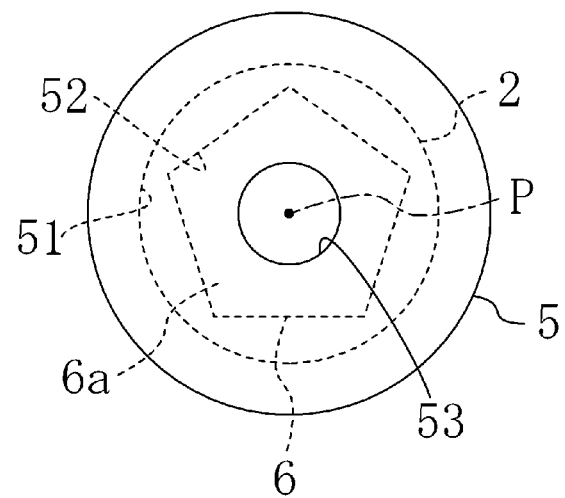
FIG. 7 is a side view of one modified example of the shape of the sensor magnet and the magnet hole, schematically showing certain major components of the motor according to a preferred embodiment of the present invention.
Figure 8:
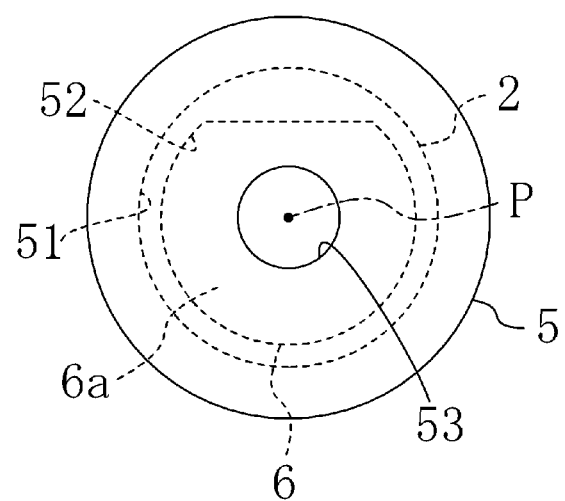
FIG. 8 is a side view of another modified example of the shape of the sensor magnet and the magnet hole, schematically showing certain major components of the motor according to a preferred embodiment of the present invention.

FIGS. 7 and 8 show preferable modified examples of the shape of the sensor magnet 6 and the magnet hole 52.

In FIG. 7, the cross-sectional shape of the magnet hole and the contour of the sensor magnet 6 preferably are pentagonal or substantially pentagonal. In FIG. 8, the cross-sectional shape of the magnet hole 52 and the contour of the sensor magnet 6 preferably are circular or substantially circular with the circumference thereof partially cut away. Alternatively, the cross-sectional shape of the magnet hole 52 and the contour of the sensor magnet 6 may be elliptical, substantially elliptical, polygonal, or substantially polygonal. In a nutshell, the cross-sectional shape of the magnet hole 52 and the contour of the sensor magnet 6 may preferably be any substantially non-circular shape. Use of any substantially non-circular shape makes it possible to restrain the sensor magnet 6 from rotating about the rotation axis P.

With the motor M according to a preferred embodiment of the present invention described above, it is possible to securely fix the sensor magnet 6 to the shaft 2 so that the sensor magnet does not rotate about the rotation axis P into a deviated position or is not be removed from the shaft 2. Moreover, the present motor M enables the sensor S to reliably detect the magnetic change in the sensor magnet 6 with increased accuracy.

The present motor M is not limited to the preferred embodiment described above but may be modified in many different forms.

For example, the air gap 54 is not always needed although it is preferably provided between the sensor magnet 6 and the shaft 2 in the foregoing preferred embodiment. If the shaft 2 is made of a non-magnetic material, the depth L of the magnet hole 52 may be set substantially equal to the thickness h of the sensor magnet 6, thereby eliminating the air gap 54.

The sensor magnet 6 may include, e.g., a pair of magnet segments each having a bonding surface whose contour is substantially square just like the cross section of the magnet hole 52. In this case, the magnet segments can be easily and reliably fixed with no positional deviation by merely inserting the S-pole side of one of the magnet segments and the N-pole side of the other magnet segment into the magnet hole 52.

The adhesive agent 10 and the elastic member 60 may be used in combination. By doing so, the sensor magnet 6 can be pressed against and fixed to the bottom surface 52a of the magnet hole 52 in a more stable manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a motor shaft;
   a sensor magnet; and
   a cover member fixed to an end portion of the motor shaft and arranged to at least partially cover an end portion of the motor shaft; wherein
   the cover member includes a support portion positioned outside an end surface of the end portion of the motor shaft, the support portion is provided with a space area having a substantially non-circular cross section which extends along a rotation axis, the sensor magnet having a non-circular outer contour which substantially conforms with the cross section of the space area, the sensor magnet being located in the space area;
   the space area has a depth that is greater than a thickness of the sensor magnet in a direction of the rotation axis; and
   a gap is defined between an axially lower surface of the sensor magnet and an axially uppermost portion of the motor shaft.

2. The motor of claim 1, wherein the sensor magnet is a sintered magnet, and the cross section of the space area and the outer contour of the sensor magnet have a substantially square shape.

3. The motor of claim 1, wherein the cover member is made of a non-magnetic material.

4. The motor of claim 1, wherein the cover member includes a first end surface, a second end surface, and a shaft hole opened at the first end surface, the end portion of the motor shaft being located in the shaft hole, the space area being opened in a bottom surface of the shaft hole, and the support portion including a through-hole defined between a bottom surface of the space area and the second end surface of the cover member.

5. The motor of claim 1, wherein the sensor magnet is fixed to the bottom surface of the space area by an adhesive such that the sensor magnet does not contact the motor shaft.

6. The motor of claim 1, further comprising an elastic member interposed between the sensor magnet and the motor shaft, the sensor magnet not being in contact with the motor shaft.

7. The motor of claim 6, wherein the elastic member is made of a non-magnetic material.

8. The motor of claim 1, wherein the end surface of the end portion of the shaft directly contacts a bottom surface of a shaft hole defined in the cover member.

* * * * *